United States Patent
Tanaka et al.

(10) Patent No.: US 7,058,049 B2
(45) Date of Patent: Jun. 6, 2006

(54) LOAD STORE QUEUE APPLIED TO PROCESSOR

(75) Inventors: Hidehiko Tanaka, Yokohama (JP); Shuichi Sakai, Ibaraki-ken (JP); Hidenori Tsuji, Tokyo (JP); Yuichiro Ajima, Funabashi (JP)

(73) Assignee: Semiconductor Technology Academic Research Center, Yokohama (JP)

( * ) Notice: Subject to any disclaimer, the term of this patent is extended or adjusted under 35 U.S.C. 154(b) by 914 days.

(21) Appl. No.: 10/092,989

(22) Filed: Mar. 8, 2002

(65) Prior Publication Data

US 2002/0141426 A1    Oct. 3, 2002

(30) Foreign Application Priority Data

Mar. 28, 2001  (JP) .............................. 2001-093994

(51) Int. Cl.
*H04L 12/50* (2006.01)
(52) U.S. Cl. ....................................... 370/383; 712/225
(58) Field of Classification Search ................ 370/363, 370/371, 379, 381, 382, 383, 395.31, 395.7, 370/395.71, 412, 413, 428, 429; 712/211, 712/220, 225, 223, 245, 216
See application file for complete search history.

(56) References Cited

U.S. PATENT DOCUMENTS

| | | | | |
|---|---|---|---|---|
| 5,467,473 A | * | 11/1995 | Kahle et al. | 712/23 |
| 5,664,215 A | * | 9/1997 | Burgess et al. | 712/23 |
| 5,809,275 A | * | 9/1998 | Lesartre | 712/216 |
| 6,137,795 A | * | 10/2000 | Tominaga et al. | 370/375 |
| 6,185,671 B1 | * | 2/2001 | Pentovski et al. | 712/216 |
| 6,266,747 B1 | * | 7/2001 | Dahl et al. | 711/154 |
| 6,266,767 B1 | * | 7/2001 | Feiste et al. | 712/217 |
| 6,269,427 B1 | * | 7/2001 | Kuttanna et al. | 711/140 |
| 6,901,500 B1 | * | 5/2005 | Hussain et al. | 711/213 |

* cited by examiner

*Primary Examiner*—Wellington Chin
*Assistant Examiner*—Brenda Pham
(74) *Attorney, Agent, or Firm*—Oblon, Spivak, McClelland, Maier & Neustadt, P.C.

(57) ABSTRACT

An in-order state queue holds store tags as in-order information about store instructions. A temporal store cache, which uses store addresses as indexes, holds store tags and store values. A first retrieving unit retrieves store tags preceding a load tag. A second retrieving unit compares the store tag read from the temporal store cache according to the address for the load instruction with the store tag from the first retrieving unit and, when they coincide with each other, outputs a hit signal.

10 Claims, 3 Drawing Sheets

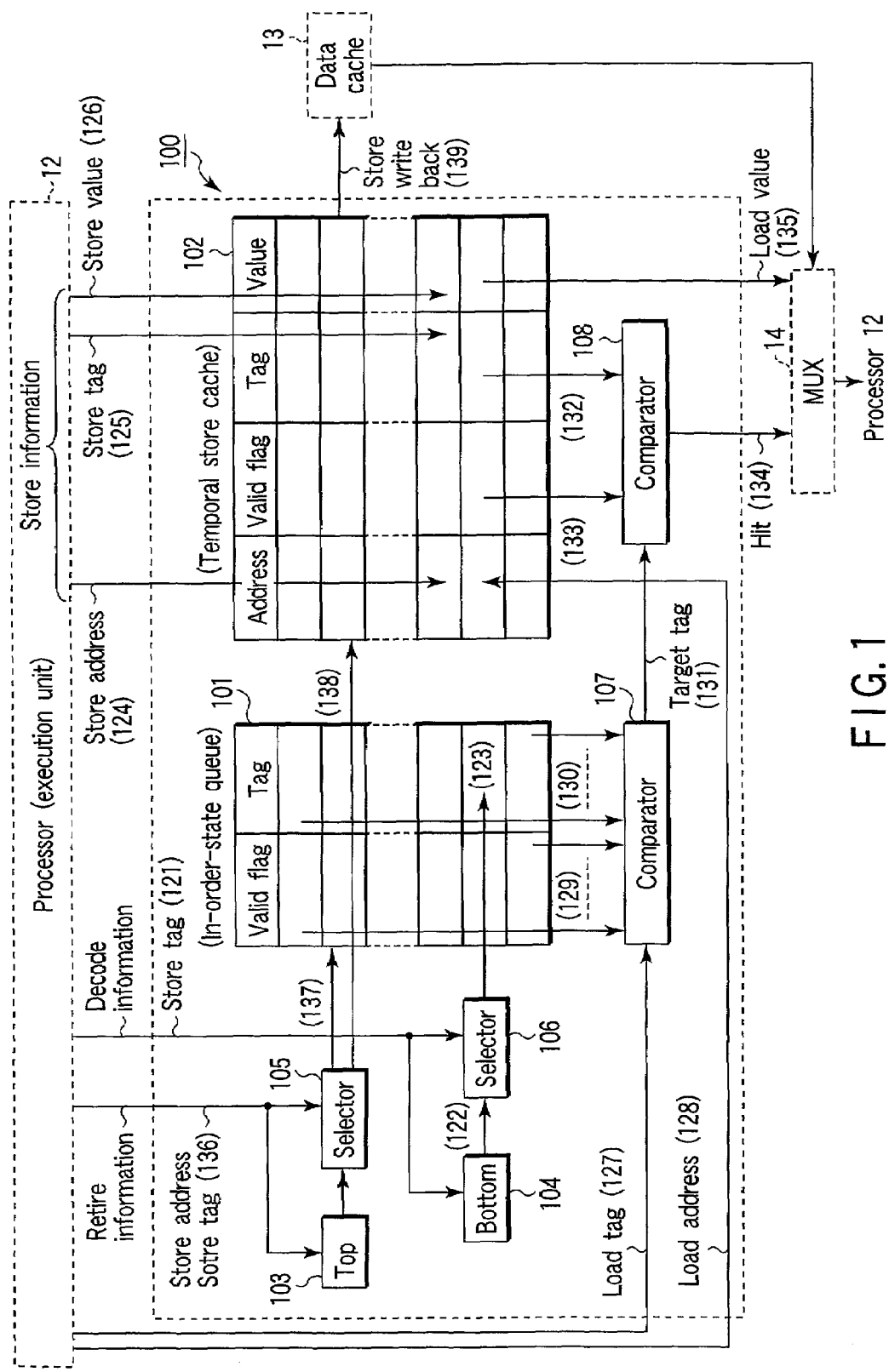
F I G. 1

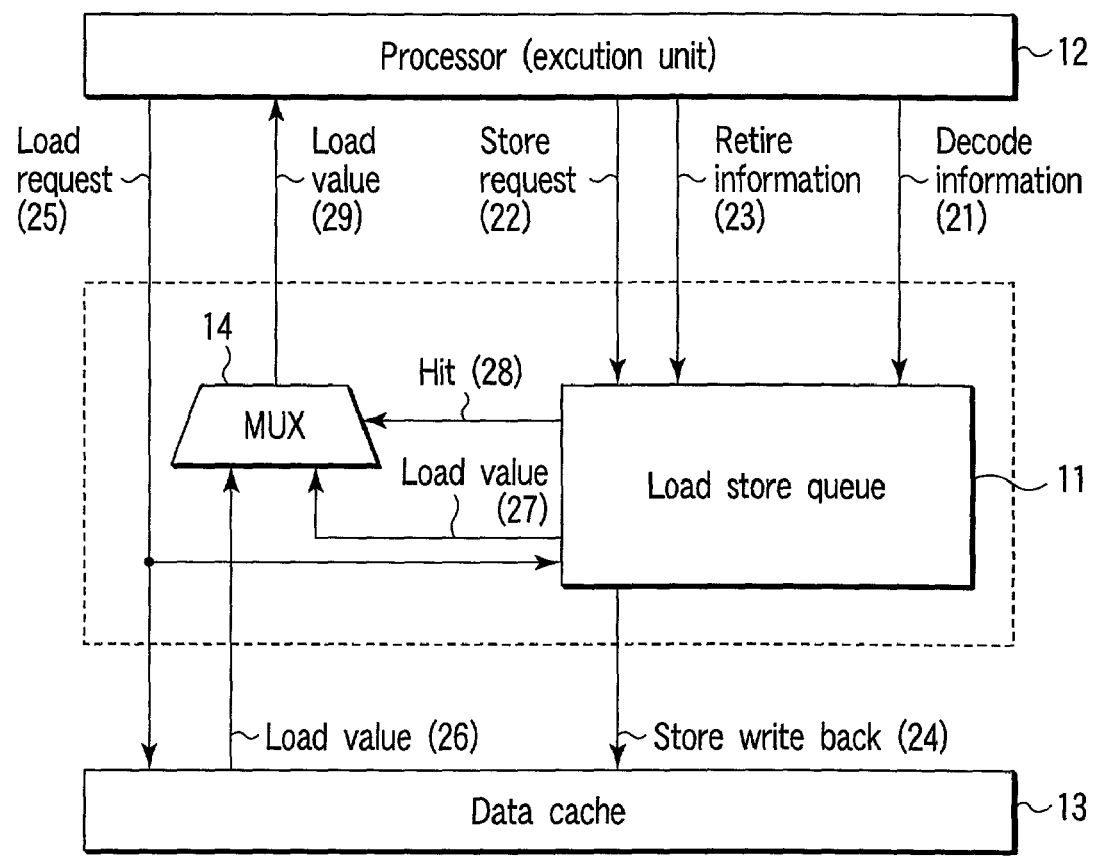
F I G. 2

LOAD STORE QUEUE APPLIED TO PROCESSOR

CROSS REFERENCE TO RELATED APPLICATION

This application is based upon and claims the benefit of priority from the prior Japanese Patent Application No. 2001-093994, filed Mar. 28, 2001, the entire contents of which are incorporated herein by reference.

BACKGROUND OF THE INVENTION

1. Field of the Invention

This invention relates to a load store queue applied to, for example, a processor.

2. Description of the Related Art

One of the instruction execution technique in a processor is out-of-order execution. In the out-of-order execution, subsequent instructions independent of the preceding instructions are executed in no special order.

A load store queue is used to maintain the data-dependency via memory for load instructions and store instructions executed out of order in a processor that performs out-of-order execution.

Specifically, the load store queue grasps the order of memory access instructions and manages the order of memory access instructions issued out of order. As a result, passing can be avoided between memory accesses having dependency in the out-of-order execution.

FIG. 2 shows the relationship among a load store queue, a processor, and a data cache.

In FIG. 2, a load store queue 11 is provided between a processor (or an execution unit) 12 and a data cache 13. The load store queue 11 receives all the store requests and load requests issued out of order from the processor, writes store instructions that guarantee "in order" into the data cache 13, and returns load values that guarantee "in order" to the processor (or the execution unit) 12 via a multiplexer (MUX) 14. The load store queue 11 is composed of a table (not shown) for holding store instructions issued out of order and a mechanism for reading and selecting the load instructions issued out of order.

The operation of the load store queue, processor, and data cache shown in FIG. 2 will be explained briefly. The operation of the load store queue is divided into the following four processes:

1. (Acquiring In-order Information)

At the time when the processor 12 decodes a store instruction (before executing of order), the load store queue 11 receives decode information (21) about the store instruction in order from the processor 12, thereby securing in-order information about the store instruction.

2. (Processing a Store Request)

At the time when the store address (the address for a store instruction) and store value (the value of a store instruction) have been determined in the processor 12, the load store queue 11 receives the store request (22) from the processor 12 and holds the store address and value in the load store queue 11. The value is held during the time when the store instruction is in an out-of-order state, that is, during the time from when the store instruction is retired until "in order" is determined.

3. (Processing a Load Request)

The load store queue 11 receives the load address according to the load request (25) from the processor 12 and processes the load instruction. If the load instruction corresponds to the store value held in the load store queue 11 (or the store value preceding the load instruction whose "in order" has not been determined), the value of the store instruction that has the value of the load instruction is taken out from the values of the store instruction held in the load store queue 11. If the corresponding store instruction is not in the load store queue 11, the load value (26) is read from the data cache 13.

In the actual operation, the processor 12 issues the corresponding load request (25) to the data cache 13 and load store queue 11 at the same time. When the store value preceding the load instruction is present in the load store queue 11, the load store queue 11 supplies a hit signal (28) indicating the presence of the data to the multiplexer 14. When receiving the hit signal (28), the multiplexer 14 selects the load value (27) from the load store queue 11. When the preceding store value is not present and the hit signal (28) is not supplied, the multiplexer 14 selects the load value (26) from the data cache 13. In this way, the load value (29) selected by the multiplexer 14 is supplied to the processor 12.

4. (Retiring a Store Instruction)

When the store instruction has been determined and an in-order state has been determined, the processor (or the execution unit) 12 outputs retire information. The load store queue 11 receives the retire information (23) and writes the store instruction in the load store queue 11 back into the data cache 13 (24). Moreover, the entry in the load store queue 11 is deleted.

FIG. 3 shows the configuration of a general load store queue. This load store queue is configured so as to realize a queue that enables associative retrieval using tag information and addresses.

Specifically, the load store queue 11 of FIG. 3 comprises a table 30 that enables associative retrieval, a pointer 31 indicating the top of the queue, a pointer 32 indicating the bottom of the queue, a plurality of selectors 33, 34, 35, and 36, compactors 37, 38, 39, and 40, and a multiplexer 41.

In the above configuration, the aforementioned four operations will be explained.

1. (Acquiring In-order Information)

In this process, the load store queue 11 receives tag information about a store instruction (or a unique number in the processor given in order) as in-order information during decoding and secures entries in order in the queue.

Specifically, the processor outputs tag information about the store instruction (or store tag (51)) as in-order information during decoding. This store tag (51) is supplied to the selector 34.

The pointer 32 specifies the entry in the table 30 corresponding to the bottom of the queue (52). The selector 34 supplies the tag information to the entry specified by the pointer 32. The tag information is written in the specified entry. At the same time, a valid flag is set (53).

At this time, the entries for the address for and the value of the store instruction in the load store queue 11 remain empty. The entry indicated by the pointer 32 is incremented by, for example, "+1" with the input timing for the store tag (51), thereby being updated.

2. (Processing a Store Request)

In this process, the load store queue 11 receives tag information about the store instruction and the address for and the value of the store instruction and writes them into the secured entries (whose tag information coincides with the above tag information).

Specifically, the processor outputs tag information about the store instruction (or store tag (54)), the address for the store instruction (store address (55)), and its store value (56) as a store request. The store tag (54) is supplied to the comparator 37. The store address (55) and store value (56) are supplied to the selectors 35 and 36, respectively.

The comparator 37 retrieves the valid flag entry of the table 30 and extracts the valid tag (57). At the same time, the comparator 37 retrieves the entry coinciding with the store tag (54) from the tag entries in the table 30 (58). In this way, the comparator 37 retrieves the entries into which the store address (55) and store value (56) are to be written.

The selectors 35, 36 supply the store address (55) and store value (56) to the retrieved entries (59). In this way, the store address (55) and store value (56) are written into the entries secured in the table 30.

3. (Processing a Load Request)

In this process, the load store queue 11 receives tag information about the load instruction and the address for the load instruction and retrieves the store instruction (retrieved using addresses) whose address coincides with the received address from the preceding store instructions (retrieved using the tag information). If the corresponding store instruction exists, the load store queue 11 outputs a hit signal notifying the existence of the corresponding store instruction and further outputs the value of the store instruction whose address coincides with the received address as the load value (forwarding the value from store to load).

Specifically, the processor outputs tag information about the load instruction (or load tag (62)) and the address for the load instruction (or load address (63)) as a load request. The compactors 38, 39 receive the load tag (62) and load address (63).

The comparator 38 retrieves the valid flag entry in the table 30 and extracts the valid tag (64). At the same time, the comparator 38 retrieves the tag entry in the table 30, thereby retrieving the store instruction (65) preceding the load tag (62).

The comparator 39 retrieves the address entry in the table 30, thereby retrieving the entry for the store instruction coinciding with the load address (63) (66).

On the basis of the output signals of the comparators 38, 39, the comparator 40 checks to see if there is the entry for a store instruction which precedes a load instruction and whose address coincides with that of the load instruction. If the result of the checking has shown that such a store instruction exists, the comparator 40 outputs a hit signal (67). The multiplexer 41 selects the corresponding entry according to the output signal of the comparator 40 and outputs the value of the entry as a load value (68).

4. (Retiring a Store Instruction)

In this process, the load store queue 11 receives tag information about a store instruction to retire as retire information and deletes the entry for the corresponding store instruction from the queue.

Specifically, the processor outputs tag information about a store instruction to retire (or store tag 69) as retire information. The selector 33 receives the store tag (69).

The pointer 31 specifies the entry in the table to be deleted corresponding to the top of the queue (70). The selector 33 supplies a store tag (69) to the entry specified by the pointer 31. As a result, the store address for the specified entry in the table 30 and the value are outputted to the data cache (71). Then, the entry is deleted. The entry pointed at by the pointer 31 is incremented by, for example, +1 with the input timing for the store tag (69), thereby being updated.

When the store request is issued to the load store queue, the load store queue of FIG. 3 has to write the address (load address) for and the value (load value) of the store instruction into the corresponding entries in the table secured in order. To retrieve the entries into which the load address and the load value are written, it is necessary to determine whether all the tag entries in the table 30 coincide with the store tags and further determine the locations into which the data is to be written. Consequently, it takes a long time for retrieval, which makes high-speed processing difficult.

Furthermore, when a load request is issued to the load store queue, the load store queue has to retrieve not only a store instruction preceding a load instruction but also an instruction whose address coincides with that of the load instruction. Specifically, with the configuration of FIG. 3, after the entries of the preceding store instructions are read, it is necessary to retrieve the one whose address coincides with that of the load instruction. Consequently, in the load requesting process, too, it is difficult to speed up the process.

Moreover, when a store request or a load request is processed, it is necessary to retrieve all the entries of the table 30 on the basis of the store addresses and load addresses. As a result, when an attempt is made to construct a table with a large number of entries, this makes the processing speed slower and complicates the circuit configuration. Thus, it is difficult to configure the circuit. Accordingly, there has been a need for a load store queue which enables not only high-speed processing to be realized but also a table with large-scale entries to be configured with small-scale circuitry.

BRIEF SUMMARY OF THE INVENTION

According to an aspect of the present invention, there is provided a load store queue comprising: a first table which stores in-order information about store instructions; a second table which stores the addresses for and the store values of store instructions, the individual entries in the second table being retrieved by using the addresses as indexes; a first retrieving unit which is connected to the first table and which, according to tag information about a load instruction, retrieves store instructions preceding the load instruction from the in-order information about the store instructions stored in the first table; and a second retrieving unit which is connected between the second table and the first retrieving unit and which outputs a coincidence signal and the store value corresponding to the store instruction as a load value, when the store instruction read from the second table according to the address for the load instruction coincides with the store instruction supplied from the first retrieving unit.

BRIEF DESCRIPTION OF THE SEVERAL VIEWS OF THE DRAWING

FIG. 1 shows the configuration of an embodiment of the present invention;

FIG. 2 is a block diagram showing the relationship between a load store queue, a processor, and a data cache.

DETAILED DESCRIPTION OF THE INVENTION

Figure 3:
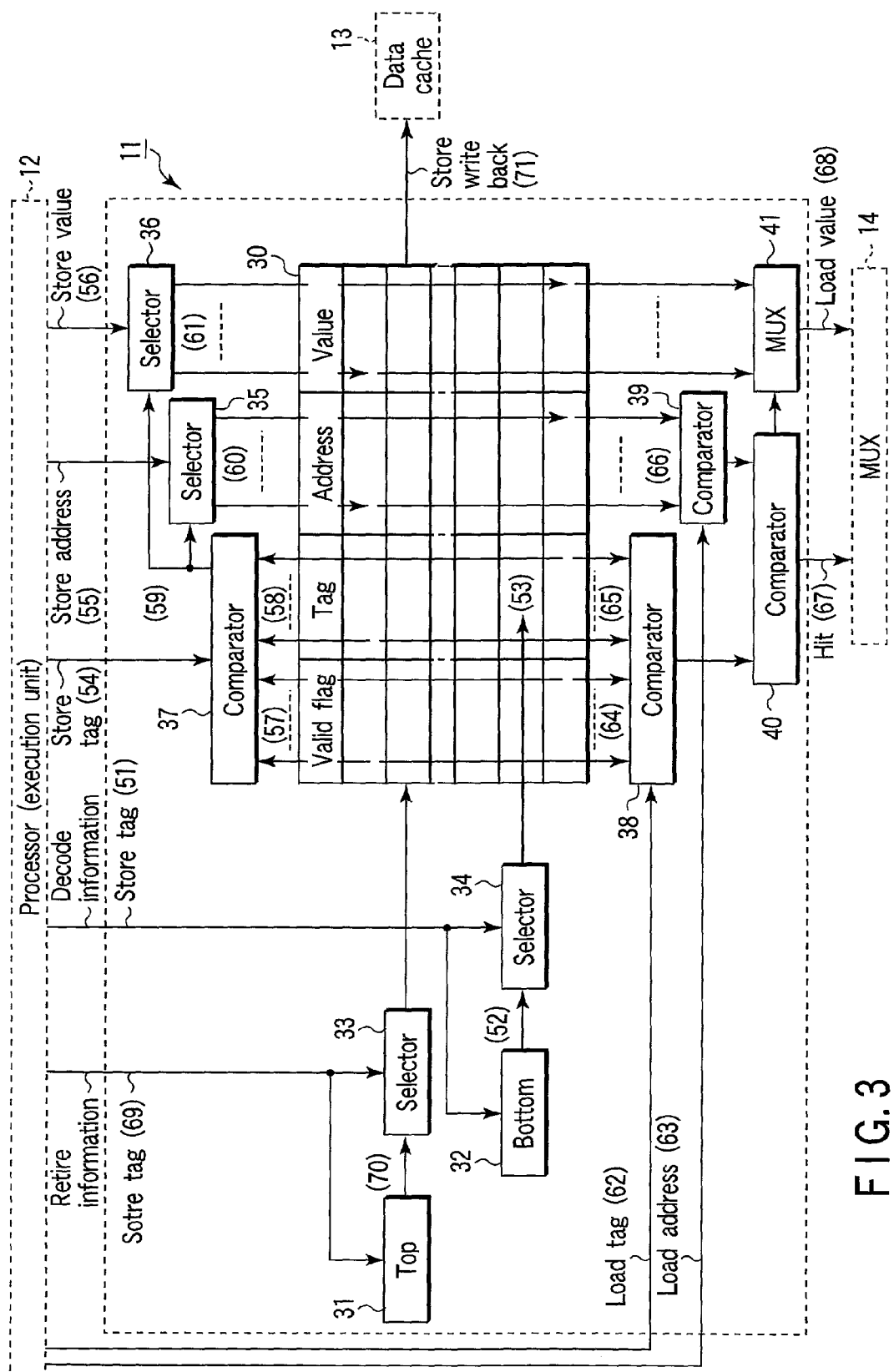
FIG. 3 is a block diagram of a general load store queue.

Hereinafter, referring to the accompanying drawings, an embodiment of the present invention will be explained.

FIG. 1 shows an embodiment of a load store queue according to the present invention.

The load store queue 11 of FIG. 3 managed in-order information about store instructions and the addresses for and the values of the store instructions on the basis of the same table 30. In contrast, the load store queue of the embodiment separates a table for storing in-order information about store instructions from a table for holding the addresses for and the values of the store instructions.

Specifically, the load store queue 100 of the embodiment shown in FIG. 1 includes an in-order state queue 101 composed of, for example, registers, a temporal store cache 102, a pointer 103, a pointer 104, selectors 105, 106, and compactors 107, 108.

The in-order state queue 101 is a table which enables associative retrieval by using tags. The in-order state queue 101 includes a plurality of tag entries and valid flag entries caused to correspond to the tag entries. The configuration of the in-order state queue 101 is not limited to this. In the in-order state queue 101, an entry is secured at the time when, for example, a load instruction or a store instruction is decoded.

On the other hand, the temporal store cache 102 is a table (a memory) which enables retrieval by using addresses as indexes. The temporal store cache 102 includes a plurality of address entries and valid flag entries, tag entries, and value entries which are caused to correspond to the address entries. At the time when, for example, an address is calculated, a store instruction writes its store value into the temporal store cache 102 by using its store address.

The pointer 103 points to the top of the in-order state queue 101, that is, the earliest one of the load store instructions being executed. The pointer 104 points to the bottom of the in-order state queue 101, that is, the latest one of the load store instructions being executed. The selector 105 receives, for example, retire information and the selector 106 receives, for example, decode information.

The comparator 107 is provided in such a manner that it corresponds to the in-order state queue 101. In processing a load request, tag information about the load instruction (or load tag) is supplied to the comparator 107. The comparator 107 searches the in-order state queue 101 for a store instruction that precedes the load instruction based on the load tag. The result of the search has shown that a preceding store instruction exists, the comparator 107 outputs the tag information about the store instruction as a target tag.

The comparator 108 is provided in such a manner that it corresponds to the temporal store cache 102. The comparator 108 is connected to the comparator 107. The comparator 108 searches the temporal store cache 102 for a tag and compares the retrieved tag with the target tag supplied from the comparator 107 to determine whether they coincide with each other.

The operation of the load store queue with the above configuration will be explained.

1. (Acquiring In-order Information)

The processor 12 outputs tag information (or store tag (121): a unique number in the processor given in order) about a store information as in-order information during decoding. The store tag (121) is supplied to the selector 106.

The pointer 104 indicates the entry at the bottom of the in-order state queue 101. The pointer 104 specifies an entry into which the store tag (121) for the in-order state queue 101 is written (122). The contents of the pointer 104 are supplied to the selector 106.

The selector 106 supplies the inputted store tag (121) to the entry at the bottom of the in-order state queue 101 specified by the pointer 104. The store tag (121) is written into the specified entry and the valid flag corresponding to the store tag is set (123).

The contents of the pointer 104 are incremented by, for example, "+1" with the input timing for the store tag (121), thereby being updated.

2. (Processing a Store Request)

Next, as a store request, the processor 12 outputs tag information about a store instruction (or store tag (125)) and the address (or store address (124)) for and the store value (126) of the store instruction.

As described above, the temporal store cache 102 is a table which enables an entry to be specified by using an address as an index. Specifically, each entry of the temporal store cache 102 is specified using the store address (124) as an index and the store tag (125) and store value (126) are written into the specified entry. The valid flag corresponding to the entry into which the store tag (125) and store value (126) has been written is set.

3. (Processing a Load Request)

Nest, as a load request, the processor outputs tag information about a load instruction (or load tag (127)) and the address for the load instruction (or load address (128)). The load tag (127) is supplied to the comparator 107. The comparator 107 searches for a preceding store instruction according to the load tag (127). Specifically, the comparator 107 searches the in-order state queue 101 for a valid entry and takes out valid tag information (129). The tag entry is retrieved according to the tag information, thereby retrieving a store instruction (or store tag) that precedes the inputted load tag (127) (130). The retrieved store instruction is supplied as a target tag (131) to the comparator 108.

On the other hand, the load address (128) is supplied as an index to the temporal store cache 102. The temporal store cache 102 reads a valid store tag (132) and the value corresponding to the valid store tag according to the load address (128) serving as an index. The read-out store tag (132) and valid flag data (133) are supplied to the comparator 108.

The comparator 108 compares the store tag (132) supplied from the temporal store cache 102 with the tag of the store instruction preceding the load instruction supplied from the comparator 107 to determine whether they coincide with each other. If the result of the comparison has shown that they coincide, the comparator 108 outputs a hit signal (134). At the same time, the store value read from the temporal store cache 102 is outputted as a load value (135).

4. (Retiring a Store Instruction)

In retiring a store instruction, the processor 12 outputs tag information about a store instruction to be retired (or store tag) and its store address (136). The selector 105 receives the store tag and store address (136).

The pointer 103 specifies the entry in the in-order state queue 101 corresponding to the top of the queue. The selector 105 supplies the store tag (136) to the entry specified by the pointer 103. According to this, the specified valid flag entry and tag entry are deleted (137).

Furthermore, the selector 105 specifies an entry in the temporal store cache 102 by using the inputted store address (136) as an index (138). The store address for and the store value of the specified entry are written back into the data cache 13 (139). At the same time, the contents of the specified entry are deleted.

Moreover, the contents of the pointer 103 are incremented by, for example, "+1" with the input timing for the store tag (136), thereby being updated.

With the embodiment, in-order information about a store instruction is stored in the in-order state queue 101 and the address for and the store value of the store instruction are stored in the temporal store cache 102 using an address as an index. As a result, the store request can be processed at high speed. Specifically, in the method of FIG. 3, to retrieve an entry to be written into, it is necessary to check to see if all the tag entries in the table coincide with the store tags and determine a destination into which writing is to be done. In contrast, the present embodiment enables the temporal store cache 102 to be searched for using store addresses as indexes, thereby determining the entry without retrieving store tags. Consequently, in the embodiment, the store process can be executed at high speed.

Furthermore, in processing a load request, a store instruction whose address coincides with that of the load instruction can be retrieved at high speed. Specifically, in the system of FIG. 3, the entries for the preceding store instructions are read. From the read-out entries, the one whose address coincides with that of the load instruction is retrieved. As a result, processing takes a long time. In the embodiment, however, the retrieval of the preceding store instructions and the reading of a store instruction whose address coincides with that of the load instruction can be executed in parallel in processing the load request. Just by determining whether they coincide, a store instruction whose address coincides with that of the load instruction can be retrieved. As a result, high-speed processing is possible.

In addition, since the temporal store cache 102 can be accessed using addresses as indexes, an entry can be determined without retrieving store tags by using store addresses. As a result, a high-speed processing is possible.

With the configuration of FIG. 3, a store request and a load request require all the entries to be retrieved using addresses. As a result, when the number of entries in the load store queue is increased, the processing speed decreases, which makes it difficult to increase the number of entries in the load store queue. In the embodiment, however, the temporal store cache 102 is composed of a table using addresses as indexes. As a result, the temporal store cache 102 can be made on a large scale. If the size of the circuitry is the same as in FIG. 3, the embodiment enables the process to be carried out faster than in the system of FIG. 3.

In the system of FIG. 3, the entries for the preceding store instructions are read. From the read-out entries, the one whose address coincides with that of the load instruction is retrieved. Therefore, a lot of comparators are needed. In contrast, in the load request processing, the embodiment needs only the following: the comparator 107 for retrieving the preceding store instructions from the in-order state queue 101 and the comparator 108 for comparing the output of the comparator 107 with the store instruction read from the temporal store cache 102. As a result, the number of comparators decreases, which leads to the advantage of simplifying the circuit configuration.

The configuration of the in-order state queue 101 into which in-order information about a store instruction is stored may take any form, provided that the state queue is a table that enables in-order information to be retrieved.

Furthermore, the temporal store cache 102 for holding the store values uses addresses as indexes. According to the size of the address space and the prepared entries, the mapping method for addresses and entries may be changed. Therefore, it is possible to apply the configuration of almost any cache using addresses as indexes to the temporal store cache 102.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A load store queue comprising:
    a first table which stores in-order information about store instructions;
    a second table which stores the addresses for and the store values of store instructions, the individual entries in said second table being retrieved by using said addresses as indexes;
    a first retrieving unit which is connected to said first table and which, according to tag information about a load instruction, retrieves store instructions preceding said load instruction from the in-order information about the store instructions stored in said first table; and
    a second retrieving unit which is connected between said second table and said first retrieving unit and which outputs a coincidence signal and the store value corresponding to said store instruction as a load value, when the store instruction read from said second table according to the address for said load instruction coincides with the store instruction supplied from said first retrieving unit.

2. The load store queue according to claim 1, wherein said first table includes:
    a plurality of tag entries which hold store tags serving as in-order information about store instructions; and
    valid flag entries which are caused to correspond to said tag entries and which hold valid flags.

3. The load store queue according to claim 2, further comprising:
    a first pointer which indicates the top of a queue in said first table; and
    a second pointer which indicates the bottom of the queue in said first table.

4. The load store queue according to claim 3, wherein the first selector, connected between said second pointer and said first table, supplies said store tag to the tag entry in said first table specified by said second pointer.

5. The load store queue according to claim 1, wherein said second table comprises:
    a plurality of address entries which store said addresses; and
    valid flag entries, tag entries for storing tags, and value entries for storing said store values which are caused to correspond to the address entries.

6. The load store queue according to claim 5, further comprising:
    a multiplexer which receives a coincidence signal and a load value supplied from said second retrieving unit and which supplies said load value to a processor according to said coincidence signal.

7. The load store queue according to claim 6, wherein a second selector, connected to said first pointer and said first and second tables, supplies a store tag serving as retire information to the tag entry in said first table specified by said first pointer and specifies an entry in said second table using store addresses serving as retire information as indexes, the store address for and the store value of the specified entry being outputted to a data cache.

8. A load store queue comprising:
    a first table which stores in-order information about store instructions and which includes a plurality of tag entries and valid flags corresponding to the tag entries;

a second table which holds store addresses serving as the addresses for store instructions, store tags serving as tag information about store instructions, and store values serving as the values of said store instructions and which enables said store tags and store values to be retrieved by using said store addresses as indexes;

a first pointer which indicates the top of a queue in said first table;

a second pointer which indicates the bottom of a queue in said first table;

a first selector which is connected between said second pointer and said first table and which supplies said store tag to the tag entry in said first table specified by said second pointer;

a first retrieving unit which is connected to said first table and which, according to the load tag of a load instruction, retrieves store tags preceding said load tag from the store tags stored in said first table and outputs the retrieved store tags; and a second retrieving unit which is connected between said first retrieving unit and said second table and which outputs not only a coincidence signal but also the store value corresponding to the store tag read from said second table as a load value, when the store tag read from said second table according to the address for said load instruction coincides with the store tag retrieved by said first retrieving unit.

9. The load store queue according to claim 8, further comprising:

a multiplexer which receives a coincidence signal and a load value supplied from said second retrieving unit and which supplies said load value to a processor according to said coincidence signal.

10. The load store queue according to claim 8, wherein a second selector, connected to said first pointer and said first and second tables, supplies a store tag serving as retire information to the tag entry in said first table specified by said first pointer and specifies an entry in said second table using store addresses serving as retire information as indexes, the store address for and the store value of the specified entry being outputted to a data cache.

* * * * *